US012486963B2

(12) United States Patent
Wen et al.

(10) Patent No.: US 12,486,963 B2
(45) Date of Patent: Dec. 2, 2025

(54) HIGHLY EFFICIENT HEAT DISSIPATION AUTOMOBILE LAMP

(71) Applicants: SHANGHAI SANSI ELECTRONIC ENGINEERING CO. LTD., Shanghai (CN); SHANGHAI SANSI TECHNOLOGY CO. LTD., Shanghai (CN); JIASHAN SANSI OPTOELECTRONIC TECHNOLOGY CO. LTD., Zhejiang (CN); PUJIANG SANSI OPTOELECTRONIC TECHNOLOGY CO. LTD., Jinhua (CN)

(72) Inventors: Xing Wen, Shanghai (CN); Shan Li, Shanghai (CN); Qi Li, Shanghai (CN); Lili Zhao, Shanghai (CN)

(73) Assignees: SHANGHAI SANSI ELECTRONIC ENGINEERING CO. LTD., Shanghai (CN); SHANGHAI SANSI TECHNOLOGY CO. LTD., Shanghai (CN); JIASHAN SANSI OPTOELECTRONIC TECHNOLOGY CO. LTD., Zhejiang (CN); PUJIANG SANSI OPTOELECTRONIC TECHNOLOGY CO. LTD., Jinhua (CN)

( * ) Notice: Subject to any disclaimer, the term of this patent is extended or adjusted under 35 U.S.C. 154(b) by 0 days.

(21) Appl. No.: 18/690,864

(22) PCT Filed: Feb. 24, 2023

(86) PCT No.: PCT/CN2023/078251
§ 371 (c)(1),
(2) Date: Mar. 11, 2024

(87) PCT Pub. No.: WO2024/113517
PCT Pub. Date: Jun. 6, 2024

(65) Prior Publication Data

US 2025/0277571 A1 Sep. 4, 2025

(30) Foreign Application Priority Data

Nov. 28, 2022 (CN) ......................... 202223169702.1

(51) Int. Cl.
*F21S 45/49* (2018.01)
*F21S 41/141* (2018.01)
*F21S 45/47* (2018.01)

(52) U.S. Cl.
CPC ............. *F21S 45/47* (2018.01); *F21S 41/141* (2018.01)

(58) Field of Classification Search
CPC ......... F21W 2102/135; F21W 2102/13; F21W 2102/155; F21W 2107/10; F21W 2102/00;
(Continued)

(56) References Cited

U.S. PATENT DOCUMENTS 6,210,024 B1 4/2001 Shida
2009/0097265 A1* 4/2009 Sun ....................... F21V 29/763
362/373
(Continued)

FOREIGN PATENT DOCUMENTS

CN 101363610 A 2/2009
CN 204829520 U 12/2015
(Continued)

OTHER PUBLICATIONS

Search English translation of CN 107314320 A (Year: 2017).*
Search English translation of KR 20110029062 A (Year: 2011).*

*Primary Examiner* — Omar Rojas Cadima
(74) *Attorney, Agent, or Firm* — IPRTOP LLC

(57) ABSTRACT

The present disclosure provides a highly efficient heat dissipation automobile lamp, including: light-emitting units, a base, and a heat dissipation mechanism. An external outline of the base is a frustum, the frustum is provided with an internal heat dissipation cavity, and the light-emitting units are evenly placed around the circumference of the frustum. The heat dissipation mechanism includes a heat dissipater and a heat dissipation rod with one of its ends connecting to the heat dissipater, and the heat dissipation rod
(Continued)

is arranged in the heat dissipation cavity. The automobile lamp of the present disclosure achieves high heat dissipation efficiency and uniform light emission in the circumferential direction of the base by arranging the light-emitting units circumferentially along the base and inserting the heat dissipation rod into the heat dissipation cavity, thereby overcoming the problems of poor heat dissipation ability and uneven light emission of LED lamps.

9 Claims, 3 Drawing Sheets

(58) Field of Classification Search
CPC ........ F21V 29/71; F21V 29/70; F21V 29/713; F21V 29/717; F21V 29/83; F21S 45/49; F21S 41/141; F21S 45/47; F21S 41/00; F21S 41/148
See application file for complete search history.

(56) References Cited

U.S. PATENT DOCUMENTS

| | | | | |
|---|---|---|---|---|
| 2010/0207502 | A1* | 8/2010 | Cao | F21V 3/00 313/46 |
| 2015/0354776 | A1* | 12/2015 | Lai | F21V 29/51 362/487 |

FOREIGN PATENT DOCUMENTS

| | | | | | |
|---|---|---|---|---|---|
| CN | 107300148 | A | | 10/2017 | |
| CN | 107314320 | A | * | 11/2017 | F21V 29/89 |
| CN | 206958833 | U | | 2/2018 | |
| CN | 210373259 | U | | 4/2020 | |
| CN | 215863189 | U | | 2/2022 | |
| KR | 20110029062 | A | * | 3/2011 | F21S 45/43 |

* cited by examiner

HIGHLY EFFICIENT HEAT DISSIPATION AUTOMOBILE LAMP

CROSS REFERENCE TO RELATED PATENT APPLICATION

The present application is the US national stage of PCT/CN2023/078251 filed on 2023 Feb. 24, which claims the priority of the Chinese patent application No. 202223169702.1 filed on 2022 Nov. 28, which application is incorporated herein by reference.

FIELD OF THE INVENTION

The present disclosure relates to the technical field of automobile lamps and lighting engineering, in particular, to a highly efficient heat dissipation automobile lamp.

BACKGROUND OF THE INVENTION

At present, LED automobile lamps have been gradually in the replacement of traditional halogen lamps and xenon lamps. LED automobile lamps can emit a variety of forms of light, improve brightness, be modified, and replace the traditional light source, thus improving the comfort and safety of driving at night. There are two issues with the existing LED automotive lamps. First, the brightness of the LED light source is related to its temperature. According to research, for every 10° C. that the temperature of the LED light source rises, the luminous efficiency decreases by about 3%, and if the temperature surpasses the threshold of the LED light source, the LED automotive lamp may fail or sustain permanent damage. The brightness of the existing LED light source is limited by its heat dissipation ability. Second, being a distributed light source, the LED light source emits non-uniform light. When the existing LED light source is mounted into the headlight assembly and then a shift occurs during use, its light becomes randomly dispersed, thus affecting the light pattern of the whole headlight and hindering the normal use of the headlight.

SUMMARY OF THE INVENTION

The present disclosure provides a highly efficient heat dissipation automobile lamp to overcome the poor heat dissipation ability and uneven light emission of the LED lamps in the existing technology.

The highly efficient heat dissipation automobile lamp includes a plurality of light-emitting units, a base, and a heat dissipation mechanism.

An external outline of the base is a frustum, the frustum is provided with an internal heat dissipation cavity, and the plurality of light-emitting units is evenly placed around the circumference of the frustum.

The heat dissipation mechanism includes a heat dissipater and a heat dissipation rod with one of its ends connecting to the heat dissipater, and the heat dissipation rod is arranged in the heat dissipation cavity.

In one embodiment, the heat dissipater includes a heat dissipation base and a plurality of heat dissipation fins integrally molded with the heat dissipation base. The plurality of heat dissipation fins is placed around the circumference of the heat dissipation base. A connection hole is arranged at the center of the heat dissipation base, and a connection end of the heat dissipation rod is inserted into the connection hole. The plurality of heat dissipation fins can increase the contact area between the heat dissipater and the environment, leading to better heat dissipation efficiency.

In an embodiment, the internal surface of the connection hole fits closely with the base, and the base is in direct contact with the heat dissipater. This allows heat from the base to be transferred to the heat dissipater through the heat dissipation base, thus further improving the heat dissipation efficiency.

In an embodiment, the space between the heat dissipation rod and the heat dissipation cavity is filled with silicone grease, which improves the overall heat dissipation performance.

In an embodiment, the highly efficient heat dissipation automobile lamp further includes a mounting chuck. The mounting chuck is sleeved on the base and in contact with the plurality of heat dissipation fins. The mounting chuck enables the highly efficient heat dissipation automobile lamp in the present disclosure to be mounted to the headlight assembly.

In an embodiment, the connection end of the heat dissipation rod and a corresponding position of the base are provided with wire slots, and the sidewall of the connection hole is provided with a wire hole. The wire slots and wire hole are used to meet the routing requirements.

In an embodiment, the highly efficient heat dissipation automobile lamp further includes a power cord. The power cord passes through the wire hole and the wire slots to connect to the plurality of light-emitting units. The power cord supplies power to the plurality of light-emitting units, and the arrangement of the wire hole and the wire slots makes the routing of the power cord more reasonable and neat.

In an embodiment, the base is made of ceramic. The insulation property of ceramic guarantees electrical safety during the use of the highly efficient heat dissipation automobile lamp in the present disclosure. Ceramic also offers superior heat dissipation ability, high-temperature resistance, corrosion resistance, and other significant features. Moreover, the service life of ceramics is several times or even dozens of times longer than that of metal under the same conditions.

In an embodiment, the heat dissipation rod is made of aluminum or copper. Aluminum or copper possess excellent thermal conductivity and can exchange heat with the environment quickly, thus satisfying the heat dissipation needs of the present disclosure.

In an embodiment, the heat dissipater is made of aluminum or copper. Aluminum or copper possess excellent thermal conductivity and can exchange heat with the environment quickly, thus satisfying the heat dissipation needs of the present disclosure.

As mentioned above, the highly efficient heat dissipation automobile lamp in the present disclosure has the following beneficial effects: when the highly efficient heat dissipation automobile lamp is in use, the heat generated by the light-emitting units is transferred to the heat dissipation rod through the base, and is further transferred to the heat dissipater through the heat dissipation rod. The evenly distributed light-emitting units can uniformly transfer the heat to the heat dissipation cavity, and the more uniformly the heat is distributed, the higher the heat dissipation efficiency. Additionally, the heat dissipation rod is arranged in the heat dissipation cavity, maximizing the contact area between the heat dissipation rod and the heat dissipation cavity and improving the heat dissipation efficiency. Since the light-emitting units are arranged circumferentially along the frustum, the emitted light is uniformly distributed around the circumference of the frustum. The automobile lamp of the present disclosure achieves high heat dissipation efficiency and uniform light emission in the circumferential direction of the base by arranging the light-emitting units circumferentially along the base and inserting the heat dissipation rod into the heat dissipation cavity, thereby overcoming the problems of poor heat dissipation ability and uneven light emission of LED lamps in the prior art.

NUMERAL REFERENCE

Figure 1:
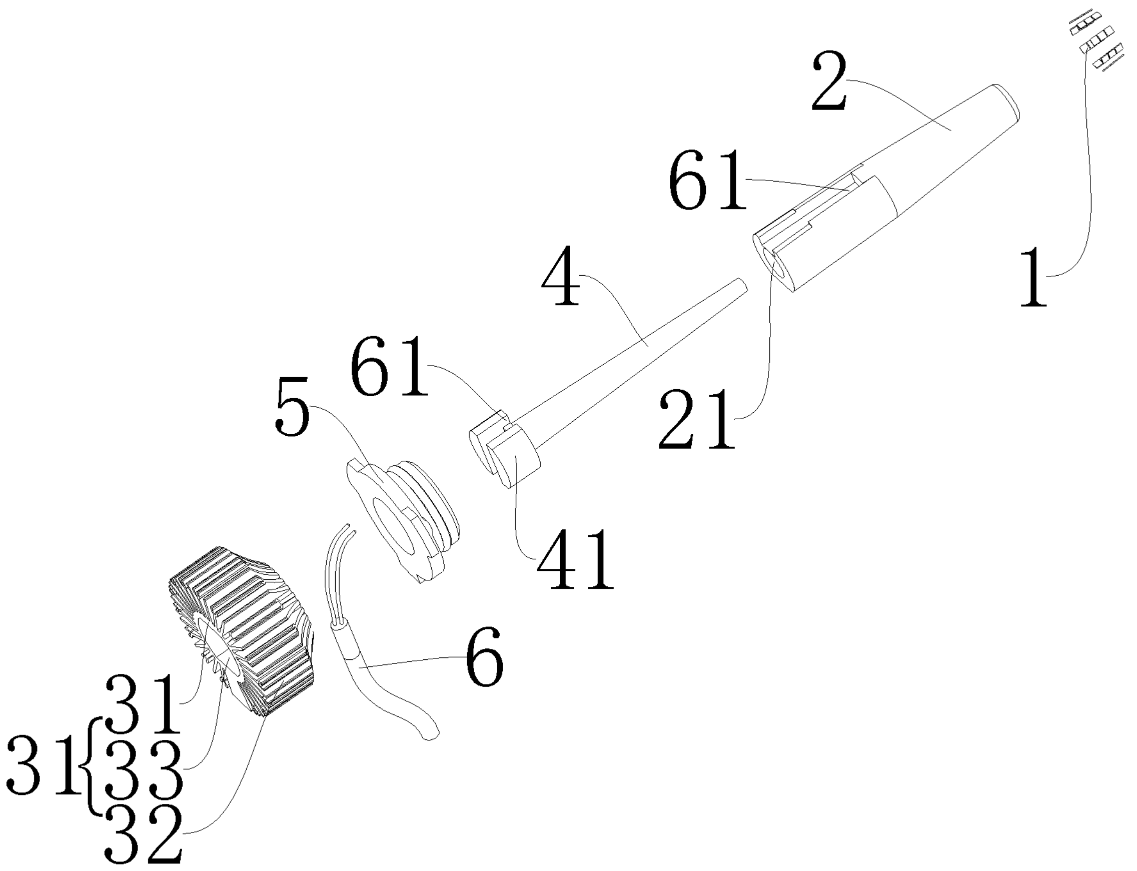
FIG. 1 shows an exploded view of a highly efficient heat dissipation automobile lamp of the present disclosure.

1 Light-emitting unit;
2 Base
21 Heat dissipation cavity
3 Heat dissipater
31 Heat dissipation base
32 Heat dissipation fin
33 Connection hole
4 Heat dissipation rod
41 Connection end
5 Mounting chuck
6 Power cord
61 Wire slot

DETAILED DESCRIPTION OF THE INVENTION

The following specific embodiments illustrate the implementation of the present disclosure, and those skilled in the art can easily understand other advantages and effects of the present disclosure from the contents disclosed in this specification.

It should be noted that the structure, proportions, sizes, etc. shown in the accompanying drawings in this specification are used only in conjunction with the contents of the specification to assist those skilled in the art in understanding and reading the present disclosure, and are not intended to limit the implementation of the present disclosure, and therefore have no technical significance. Any structural modifications, changes in proportions, or adjustments in sizes that do not affect the efficacy and purpose of the present disclosure shall still fall within the protection scope of the technical content of the present disclosure. Meanwhile, the terms in this specification such as "up", "down", "left", "right", "center" and "one" are used only for the convenience of clarity in the narrative, and are not used to limit the implementation scope of the present disclosure. The changes or adjustments in the relative relationship, in the absence of substantial changes in the technical content of the present disclosure, are also considered to be within the implementation scope of the present disclosure.

As shown in the drawings, a highly efficient heat dissipation automobile lamp is provided in the present disclosure. The lamp includes a plurality of light-emitting units 1, a base 2, and a heat dissipation mechanism.

An external outline of the base 2 is a frustum, the frustum is provided with an internal heat dissipation cavity 21, and the light-emitting units 1 are evenly placed around the circumference of the frustum.

The heat dissipation mechanism includes a heat dissipater 3 and a heat dissipation rod 4 with one of its ends connecting to the heat dissipater 3, and the heat dissipation rod 4 is arranged in the heat dissipation cavity 21.

When the highly efficient heat dissipation automobile lamp in the present disclosure is in use, the heat generated by the light-emitting units 1 is transferred to the heat dissipation rod 4 through the base 2 and further transferred to the heat dissipater 3 from the heat dissipation rod 4. The uniformly arranged light-emitting units 1 can evenly transfer the heat to the heat dissipation cavity 21, and the more uniformly the heat is distributed, the higher the efficiency of heat dissipation. Additionally, the heat dissipation rod 4 is disposed in the heat dissipation cavity 21 so as to maximize the contact area between the heat dissipation rod 4 and the heat dissipation cavity 21 and improve the heat dissipation efficiency. Since the light-emitting units 1 are arranged in a circumferential direction along the frustum, the emitted light is evenly distributed in a circumferential direction of the frustum.

Figure 2:
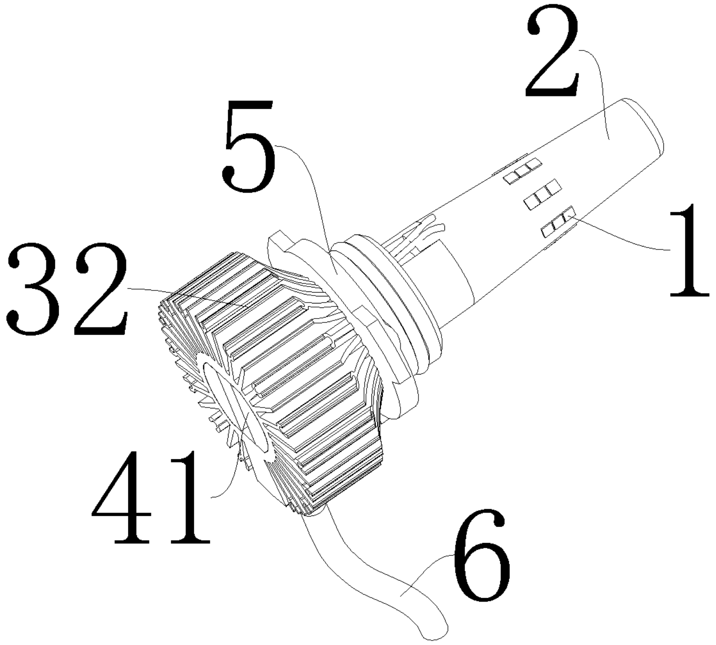
FIG. 2 shows a schematic diagram of the highly efficient heat dissipation automobile lamp of the present disclosure.

In this embodiment, as shown in FIG. 1 and FIG. 2, the heat dissipater 3 includes a heat dissipation base 31 and a plurality of heat dissipation fins 32 integrally molded with the heat dissipation base 31. The plurality of heat dissipation fins 32 are placed around the circumference of the heat dissipation base 31. A connection hole 33 is arranged at the center of the heat dissipation base 31, and a connection end 41 of the heat dissipation rod 4 is inserted into the connection hole 33. The plurality of heat dissipation fins 32 can increase the contact area between the heat dissipater 3 and the environment, leading to better heat dissipation efficiency. Furthermore, in this embodiment, an external outline of the heat dissipation base 31 is a cylinder, and the plurality of heat dissipation fins 32 are arranged circumferentially along the side surface of the cylinder. An external outline of the plurality of heat dissipation fins 32 is also a cylinder, thereby increasing the contact area between the plurality of heat dissipation fins 32 and the environment and improving the heat dissipation efficiency. Additionally, in this embodiment, the connection end 41 of the heat dissipation rod 4 and a corresponding position of the base 2 are provided with wire slots 61, and the sidewall of the connection hole 33 is provided with a wire hole. The wire slots 61 and wire hole are used to meet the wire routing requirements of a power cord 6. The outline of the connection hole 33 is circular and the inner side thereof is partially truncated, and the external outline of the corresponding connection end 41 of the heat dissipation rod 4 is a cylinder and the sidewall thereof is partially truncated, so that the connection end 41 of the heat dissipation rod 4 is prevented from rotating in the connection hole 33, and it is also convenient to position the wire hole and the wire slots 61 at the same time.

In this embodiment, the light-emitting unit includes a light-emitting diode, and the light-emitting diode includes an ordinary monochromatic light-emitting diode, a high-brightness light-emitting diode, an ultra-high-brightness light-emitting diode, a color-changing light-emitting diode, a flashing light-emitting diode, a voltage-controlled light-emitting diode, an infrared light-emitting diode, and a negative resistance light-emitting diode.

Figure 4:
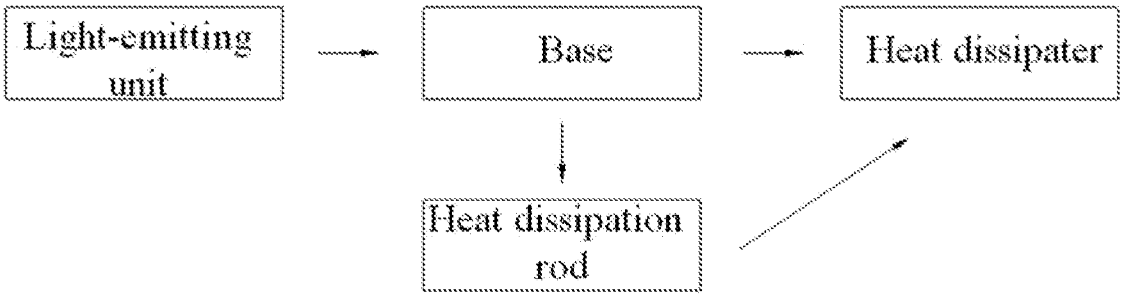
FIG. 4 shows a heat dissipation path diagram of the highly efficient heat dissipation automobile lamp of the present disclosure.

In this embodiment, as shown in FIG. 1 and FIG. 2, the internal surface of the connection hole 33 fits closely with the base 2, and the base 2 is in direct contact with the heat dissipater 3. This allows heat from the base 2 to be transferred to the heat dissipater 3 through the heat dissipation base 31, thus further improving the heat dissipation efficiency. In this embodiment, as shown in FIG. 4, one of the heat dissipation paths is that the heat is transferred from the light-emitting units 1 to the base 2, and then directly transferred to the heat dissipater 3, and the other heat dissipation path is that the heat is transferred from the light-emitting units 1 to the base 2, and then transferred to the heat dissipation rod 4, followed by being transferred to the heat dissipater 3. The two heat dissipation paths allow for faster heat dissipation.

In this embodiment, the space between the heat dissipation rod 4 and the heat dissipation cavity 21 is filled with silicone grease, which improves the overall heat dissipation performance.

Figure 3:
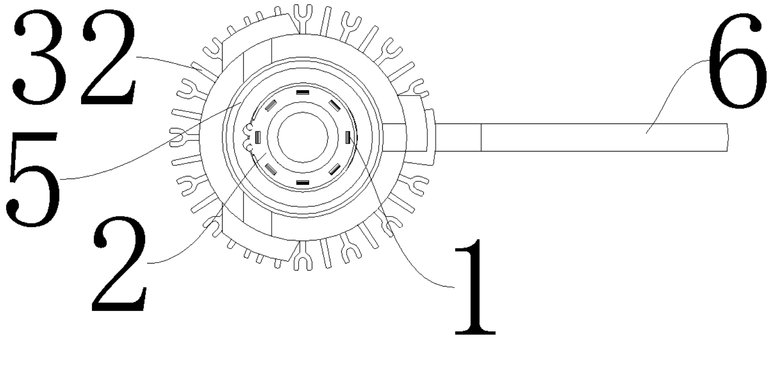
FIG. 3 shows a schematic diagram of the highly efficient heat dissipation automobile lamp of the present disclosure from another viewpoint.

In this embodiment, as shown in FIGS. 1-3, the highly efficient heat dissipation automobile lamp further includes a mounting chuck 5. The mounting chuck 5 is sleeved on the base 2 and in contact with the plurality of heat dissipation fins 32. The mounting chuck 5 enables the highly efficient heat dissipation automobile lamp in the present disclosure to be mounted to a headlight assembly. Furthermore, in this embodiment, as shown in FIGS. 1-2, the mounting chuck 5 is provided with mounting threads for mating with the structure on the automobile headlight assembly.

In this embodiment, as shown in FIGS. 1-3, the highly efficient heat dissipation automobile lamp further includes the power cord 6. The power cord 6 passes through the wire hole and the wire slots 61 to connect to the plurality of light-emitting units 1. The power cord 6 supplies power to the plurality of light-emitting units 1, and the arrangement of the wire hole and the wire slots 61 make the routing of the power cord 6 more reasonable and neat. In this embodiment, the base 2 is provided with two solder joints to connect to the power cord 6.

In this embodiment, the base 2 is made of ceramic. The insulation property of ceramic guarantees electrical safety during the use of the highly efficient heat dissipation automobile lamp in the present disclosure. Ceramics also offers superior heat dissipation ability, high-temperature resistance, corrosion resistance, and other significant features. Moreover, the service life of ceramics is several times or even dozens of times longer than that of metal under the same conditions. In this embodiment, the use of a unique surface-mount technology to attach the LEDs to the ceramic reduces the number of base fixtures and greatly simplifies the assembly process.

In this embodiment, the highly efficient heat dissipation automobile lamp further includes a heat dissipation fan. The heat dissipation fan is used to accelerate the air flow around the heat dissipater 3 to improve the heat dissipation efficiency.

In this embodiment, the heat dissipation rod 4 is made of aluminum or copper. Aluminum or copper possess excellent thermal conductivity and can exchange heat with the environment quickly, thus satisfying the heat dissipation needs in this embodiment.

In this embodiment, the heat dissipater 3 is made of aluminum or copper. Aluminum or copper possess excellent thermal conductivity and can exchange heat with the environment quickly, thus satisfying the heat dissipation needs in this embodiment.

In summary, the highly efficient heat dissipation automobile lamp in this embodiment realizes high heat dissipation efficiency of the automobile lamp and uniform light emission in the circumferential direction of the base 2 by arranging the light-emitting units 1 in the circumferential direction of the base 2 and inserting the heat dissipation rod 4 in the heat dissipation cavity 21 of the base 2, and overcomes the problems of poor heat dissipation ability and uneven light emission of the LED lamps in the prior art. Therefore, this embodiment effectively overcomes the shortcomings of the prior art and has highly industrial utilization value.

The above embodiments are only illustrative of the principles and efficacy of the present disclosure and are not intended to limit the present disclosure. Any person familiar with this filed may modify or change the above embodiments without violating the spirit and scope of the present disclosure. Therefore, all equivalent modifications or changes made by a person having ordinary knowledge in the art without departing from the spirit and technical ideas disclosed in this embodiment shall be covered by the claims of the present disclosure.

The invention claimed is:

1. A highly efficient heat dissipation automobile lamp, comprising:

a plurality of light-emitting units (1);

a base (2), wherein an external outline of the base (2) is a frustum, the frustum is provided with an internal heat dissipation cavity (21), and the plurality of light-emitting units (1) is evenly placed around a circumference of the frustum;

a heat dissipation mechanism, wherein the heat dissipation mechanism comprises a heat dissipater (3) and a heat dissipation rod (4) with one of its ends connecting to the heat dissipater (3), and the heat dissipation rod (4) is arranged in the heat dissipation cavity (21); and a mounting chuck (5), wherein the mounting chuck (5) is sleeved on the base (2) and in contact with the plurality of heat dissipation fins (32).

2. The highly efficient heat dissipation automobile lamp according to claim 1, wherein the heat dissipater (3) comprises a heat dissipation base (31) and a plurality of heat dissipation fins (32) integrally molded with the heat dissipation base (31), wherein the plurality of heat dissipation fins (32) are placed around a circumference of the heat dissipation base (31), a connection hole (33) is arranged at the center of the heat dissipation base (31), and a connection end (41) of the heat dissipation rod (4) is inserted into the connection hole (33).

3. The highly efficient heat dissipation automobile lamp according to claim 2, wherein an internal surface of the connection hole (33) fits closely with the base (2).

4. The highly efficient heat dissipation automobile lamp according to claim 2, wherein the connection end (41) of the heat dissipation rod (4) and a corresponding position of the base (2) are provided with wire slots (61), and a sidewall of the connection hole (33) is provided with a wire hole.

5. The highly efficient heat dissipation automobile lamp according to claim 4, further comprising a power cord (6), wherein the power cord (6) passes through the wire hole and the wire slots (61) to connect to the plurality of light-emitting units (1).

6. The highly efficient heat dissipation automobile lamp according to claim 1, wherein a space between the heat dissipation rod (4) and the heat dissipation cavity (21) is filled with silicone grease.

7. The highly efficient heat dissipation automobile lamp according to claim 1, wherein the base (2) is made of ceramic.

8. The highly efficient heat dissipation automobile lamp according to claim 1, wherein the heat dissipation rod (4) is made of aluminum or copper.

9. The highly efficient heat dissipation automobile lamp according to claim 1, wherein the heat dissipater (3) is made of aluminum or copper.

* * * * *